(12) United States Patent
Boon

(10) Patent No.: US 6,800,263 B1
(45) Date of Patent: Oct. 5, 2004

(54) NON-CAKING SODIUM CHLORIDE CRYSTALS, A PROCESS TO MAKE THEM, AND THEIR USE IN AN ELECTROLYSIS PROCESS

(75) Inventor: Herman Frans Boon, Hengelo (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/958,014

(22) PCT Filed: Mar. 27, 2000

(86) PCT No.: PCT/EP00/02687

§ 371 (c)(1),
(2), (4) Date: Dec. 11, 2001

(87) PCT Pub. No.: WO00/59828

PCT Pub. Date: Oct. 12, 2000

(30) Foreign Application Priority Data

Apr. 2, 1999 (EP) .......................................... 99201007

(51) Int. Cl.⁷ ............................................... C01D 3/00
(52) U.S. Cl. ...................................... 423/268; 252/383
(58) Field of Search ........................... 423/268; 252/383

(56) References Cited

U.S. PATENT DOCUMENTS 6,491,964 B1 * 12/2002 Setz et al. .................. 426/649

FOREIGN PATENT DOCUMENTS

| DE | 1139819 | 11/1962 |
| DE | 1909564 | 12/1970 |
| FR | 2063578 | 7/1971 |
| FR | 2129219 | 10/1972 |
| GB | 478629 | 1/1938 |
| GB | 908017 | 10/1962 |

OTHER PUBLICATIONS

L. Phoenix, "How Trace Additives Inhibit the Caking of Inorganic Salts", British Chemical Engineering, Jan., 1966, vol. 11, No. 1, pp. 34–38.
Search Report of PCT/EP00/02687, no date.
Derwent Patent Abstract No. 1971–65204S/197141, no month.
Derwent Patent Abstract No. 1973–07172U/197306, no month.
Derwent Patent Abstract No. 1970–92356R/197050, no month.

* cited by examiner

Primary Examiner—Steven Bos
(74) Attorney, Agent, or Firm—Richard P. Fennelly

(57) ABSTRACT

The invention relates to specific non-caking salt (NaCl) compositions with a pH of 1–10 comprising at least one metal (iron, titanium and/or chromium) complex of a hydroxypolycarboxylic acid, a process to make such compositions, as well as the use of such compositions in table salt, road salt, or electrolysis salt. Preferred compositions comprise an iron complex of (meso)tartaric acid for use in membrane electrolysis operations.

5 Claims, No Drawings

NON-CAKING SODIUM CHLORIDE CRYSTALS, A PROCESS TO MAKE THEM, AND THEIR USE IN AN ELECTROLYSIS PROCESS

The present invention is national phase filing based on PCT application Ser. No. PCT/EP00/02687, filed Mar. 27, 2000, which claims priority from European Patent Application Ser. No. 99201007.4, filed Apr. 2, 1999.

The present invention relates to non-caking sodium chloride (salt) compositions comprising iron, titanium and/or chromium complexes of hydroxypolycarboxylic compounds as an anti-caking additive, to a process to make such non-caking sodium chloride compositions, as well as to the use of such non-caking sodium chloride compositions to make brine, a solution of essentially NaCl in water, for electrolysis in, preferably, membrane cells.

GB 908,017 discloses the use of ammonium ferric salts of hydroxy-polycarboxylic compounds as anti-caking agents for salt. It is stated that, "Where the number of acidic, for example carboxylic, functions is in excess of the valence of the iron, the excess, in neutral compounds, is neutralised by a basic atom or molecule such as an alkali or alkaline earth metal atom or, preferably, an ammonium radical." It is not stated that the compounds must be neutral. Also, only ammonium ferric compounds are disclosed, while it is not shown that neutralising species other than ammonia can be used. Furthermore, it is disclosed neither that salt is not caking when it is treated with ferric compounds neutralised with a product other than ammonia, nor that it is advantageous to use other neutralizing agents than ammonia. In this respect, reference is made to *British Chemical Engineering* Vol. 11, No 1 (January 1966), pages 34 and 35, where numerous compounds were evaluated for their efficiency in rendering salt crystals non-caking. The majority of the evaluated compounds were shown not to be effective. The effective compounds all contained one or more nitrogen atoms or undesired heavy metals. Therefore, heavy metal-free anti-caking agents were considered to inevitably contain nitrogen. Typically, the nitrogen is present in the form of cyanide or substituted ammonia groups. Till the present day, sodium or potassium ferrocyanide has been the product of choice. However, the use of anti-caking agents containing nitrogen, especially in the form of cyanide groups, is undesired. More particularly, there is an ongoing debate in respect of the desirability of a sodium or potassium ferrocyanide in table salt. Furthermore, the use of sodium or potassium ferrocyanide, or other nitrogen-containing anti-caking agents, gives difficulties in electrolysis operations because of the formation of $NCl_3$. Especially when the $NCl_3$ accumulates, which is the case if chlorine gas is liquified as commercial in electrolysis operations, its formation is highly undesired because the resulting product is explosive. FR 69.36254 proposes to use ferric acetate, which is said not to suffer from these disadvantages, as an anti-caking agent for salt. However, ferric acetate was found not to be a sufficiently effective anti-caking additive for salt.

A further disadvantage of commercially used potassium ferrocyanide is the fact that the iron introduced by this agent can only be removed from brine produced from salt containing said anti-caking agent if special decomposition unit is used. Especially when the brine is used in membrane electrolysis cells, the iron that is not removed will precipitate, typically in the form of the hydroxide, in and on the membrane. This leads to less efficient membrane electrolysis operations.

For these reasons, the search for improved anti-caking salt additives has been ongoing and the need for improved non-caking salt compositions still exists.

Surprisingly, we have now found that non-caking salt compositions can be produced which do not suffer from the above-mentioned disadvantages. These non-caking salt compositions, where the salt is predominantly sodium chloride, are characterized in that they
- are essentially nitrogen-free,
- comprise a metal complex of hydroxypolycarboxylic acids, with the molar ratio between metal and hydroxypolycarboxylic acid being from 0.2 to 10, wherein the metal is selected from iron, titanium and/or chromium,
- and have a pH of 1–10, preferably 3 to 9.

The pH requirement may be met without further additives being used, depending on the pH of the salt that is used. If the requirement is not met, then optional pH control agents can be used to obtain the desired pH.

The term "predominantly sodium chloride" is meant to denominate all salt of which more than 50% by weight consists of NaCl. Preferably, such salt contains more than 90% by weight of NaCl. More preferably, the salt contains more than 92% of NaCl, while a salt of more than 95% by weight NaCl is most preferred. Typically, the salt will contain about 2.5–3% water. The salt may be rock salt, solar salt, salt obtained by steam evaporation of water from brine, and the like.

The term "essentially free of nitrogen" is used for compositions that during electrolysis operation do not form $NCl_3$. Generally, this means that only traces of nitrogen-containing species (other than inert $N_2$ gas) are allowed in the composition. The amount of nitrogen atoms of said species in the composition is preferably less than 1 mg/kg, more preferably less than 0.1 mg/kg, while an amount of less than 0.01 mg/kg is most preferred. Higher amounts of such nitrogen are highly undesired, since they make the salt less suitable for use in membrane electrolysis operations.

The preferred pH range of the salt composition, measured as described below, depends on the type of hydroxypolycarboxylic acid used. For instance, it was observed that for iron-citric acid complexes, the preferred pH range is 6–10, since at this pH the best anti-caking performance was observed. For iron-mesotartaric acid complexes, on the other hand, the preferred pH range is 2–9, more preferably 3–7, while a pH ranging from 4 to 5 is most preferred. Which exact pH range works best for the other hydroxypolycarboxylic acids can be established simply by evaluating the caking behaviour of salt that has been treated with metal complexes of these products at the various pHs. The pH can be adjusted, if so desired, by means of any conventional acid or base. The acid or base can be added separately or together with the anti-caking agent. For the final composition to be nitrogen-free, the acid and base cannot be selected from nitrogen-containing products. Preferably, the pH of untreated salt is first adjusted to the desired level, after which a solution comprising one or more of the metal complexes of hydroxypolycarboxylic acids with the same pH is added to the salt. The way the anti-caking agent and the acid or base are introduced depends on the desired water content of the resulting salt and the water content of the salt to be treated. Typically, a concentrated solution of the agents is sprayed onto the salt.

If so desired, an additional pH buffer may be added to the salt and/or the treatment solution. The buffers to be used are of the conventional type. Preferably, they are organic acids. More preferably, they are carboxylic acids. Most preferably they are carboxylic acids that do not contain —$CH_3$ and/or —$CH_2$—groups for the reason given below, such as formic acid and oxalic acid. The acid in the buffer of choice preferably has a pK value in aqueous solution around the desired pH, as is known in the art. The mesotartrate anti-caking agent was found to be best combined with formic acid as the pH buffer. The pH buffer can be used with or without the optional pH control agent being used. The pH buffer can be introduced into the salt composition by spraying the pure compound, a separate solution, and/or by introduction after mixing with the anti-caking treatment solution. Preferably, a treatment solution is sprayed onto the salt which comprises a metal source, hydroxypolycarboxylic acid, optionally a pH control agent, and optionally a pH buffer.

The metal source to be used to make the metal complexes of hydroxy-polycarboxylic acids according to the invention can be any conventional, water-soluble metal salt. Preferably, the salt is essentially nitrogen-free as in chlorides, sulfates, and the like. The metals that can be used are iron, titanium and/or chromium.

It was observed that the presence of other metals does not remove the beneficial non-caking effect of the metal complexes according to the invention. Therefore, it is not necessary to use 100% pure metal sources. They may be combined with other metals that are less active or inactive, or may be contaminated with metals that are less desired, such as aluminium. Preferably more than 1, more preferably more than 5, most preferably more than 10% by weight of all metal in the composition is selected from iron, titanium and/or chromium. If the total amount of metal in the formulation has to be kept to a minimum, it is preferred that more than 25, more preferably more than 50, even more preferably more than 75, and most preferably more than 90% by weight of all metal in the salt composition is selected from iron, titanium and/or chromium. For various reason, including the fact that iron can be removed easily from brine if it is not complexed too strongly, as in the present case, the use of iron complexes is most preferred.

The hydroxypolycarboxylic acids that can be used according to the invention are selected from compounds having from 3 to 10 carbon atoms, one or more hydroxy groups, and two or more carboxylic acid groups, or mixtures of such acids. Acids that can be used according to the invention include citric acid, tartaric acid, saccharinic acid, ascorbic acid, saccharic acid, mucic acid, and isomers thereof. Complexes of iron, titanium, and chromium with these hydroxypolycarboxylic acids were found to render salt non-caking at low concentrations. Preferably, the hydroxypolycarboxylic acids do not comprise —$CH_2$— and/or —$CH_3$ groups, since the presence of such groups was found to result in the formation of undesired chloroform and/or other chlorinated organic compounds in electrolysis operations. Said chlorinated organics, i.e. chloroform, contaminate the chlorine that is produced from brine containing said acids. Examples of preferred hydroxypolycarboxylic acids are tartaric acid, mucic acid, and saccharic acid. The use of tartaric acid, particularly mesotartaric acid of formula

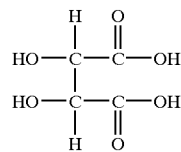

has several advantages over the use of other hydroxypolycarboxylic acids because its use i) results in an excellent anti-caking effect at the indicated pH range, ii) gives a favourable strong dependency of anti-caking performance on pH, iii) allows the easy removal of iron from brine produced with salt comprising the iron complexes of this acid, and iv) because residual (meso)tartaric acid ions in brine solutions do not interrupt membrane electrolysis operations. The product when used in electrolysis operations did not result in the formation of $NCl_3$, chloroform and/or otherchlorinated organic compounds. For this reason, and because mesotartaric acid was found to be the most effective anti-caking agent, mesotartaric acid is the most preferred hydroxypolycarboxylic acid. Because it was observed that mesotartaric can be used in combination with one or more other hydroxypolycarboxylic acids without a dramatic decrease in performance being observed, also such mixtures can be used. If a mixture of acids is used, it is preferred that at least 5, preferably more than 10, more preferably more than 20, even more preferably more than 35, and most preferably more than 50% by weight of all acid in the formulation is mesotartaric acid.

A preferred mixture of tartaric acid, which includes mesotartaric acid, can be prepared in a conventional way by treating a natural or synthetic tartaric acid (CAS registry numbers 87-69-4 and 147-71-7, respectively) solution with concentrated NaOH at temperatures above 100° C. Part of the L-, D-, and/or DL-tartaric acid is then converted to the desired mesotartaric acid (CAS registry number 147-73-9). The use of the nitrogen-free metal complexes of hydroxypolycarboxylic acids as an anti-caking agent was also found to bring the additional benefit that water that adheres to the salt is less likely to segregate upon storage.

It is noted that because of the pH dependency of the anti-caking agent based on hydroxypolycarboxylic acids, and in particular (meso)tartaric acid, it is possible to form blocks of salt from non-caking salt merely by changing its pH to a value at which the anti-caking effect does not exist and subsequently applying pressure. Such blocks can be used, for instance, in salt dissolvers, e.g. in water softening installations, where such salt blocks show less bridging. However, they may also be used as salt licks for animals. Residual iron complexes of hydroxypoly-carboxylic acid in such salt licks are not considered to be a problem.

In membrane electrolysis operations, the use of (meso) tartaric acid based anti-F caking agents has the benefit that if (meso)tartaric acid enters the electrolysis cell, it does not harm the membrane (no deposit is formed) while it is rapidly decomposed in the anode chamber, releasing only harmless gaseous products (typically just $CO_2$). This is in contrast with various other hydroxypolycarboxylic acids, such as the less desired citric acid which was found to generate chloroform. Furthermore, it was found that brine obtained by the dissolution of non-caking salt according to the invention can be purified, i.e. freed of iron, with greater ease than brine containing alkali iron cyanide complexes, probably because of the weaker complexing power of the hydroxypolycarboxylic acids. The improved removal of metal from the brine prolongs the life of the membranes in brine electrolysis cells, also in view of the fact that the voltage drop over the membrane remains more constant over time, because less metal, i.e. iron, is carried into the cell and, consequently, less metal hydroxide or oxide is deposited in and on the membrane. The fact that the metal, i.e. iron, is now removed more easily allows for substantial savings in the brine purification step and the electrolysis operation. The metal, i.e. iron, removal step can be performed in the conventional way by increasing the pH of the brine to precipitate the hydroxide and subsequent removal of the hydroxide by filtration. For these reasons, a preferred embodiment of the invention is a membrane electrolysis operation using brine obtained by the dissolution of a salt composition according to the invention.

More preferably, such an operation includes a process step wherein metal ions are removed from the brine.

Because the valency of the metal in the salt may vary and because different types of hydroxypolycarboxylic acids, with various amounts of carboxylic acid groups per molecule, can be used according to the invention, the molar ratio of metal to hydroxypolycarboxylic acid may vary over a wide range. If iron is used as the metal, both di- and tri-valent ions (ferro- and ferri-ions, respectively) are used with success. Practically, the metal in the final salt formulation will be present in all valencies. Therefore, the term metal complex of hydroxypolycarboxylic acid is used throughout this specification to denote compositions comprising metal ions in various valencies and a hydroxypolycarboxylic acid moiety in ionic form. If iron is used as the metal, ferro-compounds are preferred, because they were found to give a slightly better anti-caking performance.

The amount of hydroxypolycarboxylic acid in respect of the amount of metal ions will depend on the overall valency of the metal ions and on the nature of the hydroxypolycarboxylic acid, particularly the amount of carboxylic acid substituents per mole of acid. For the non-caking salt of the present invention, a suitable molar ratio between iron and hydroxypolycarboxylic acid is from 0.2 to 10. However, for the various hydroxypolycarboxylic acids different optimum ratios were found by simply evaluating the caking behaviour of the salt to which the products were added. For citrates, for example, a preferred range for the molar ratio of iron to acid is 0.75 to 2. For the preferred (meso)tartaric acid salts the preferred range was found to be 1.5 to 3.

The metal complexes of hydroxypolycarboxylic acids are preferably used in an amount such that less than 20 mg of metal per kg is introduced into the final non-caking salt formulation. More preferably, the amount used introduces less than 10 mg metal per kg of the formulation, while most preferably, the amount of metal introduced is less than 5 mg/kg. A preferred non-caking composition according to the invention includes about 3 mg/kg of Fe" and 16 mg/kg of tartaric acid ions, most preferably mesotartaric acid ions.

The metal complexes of the hydroxypolycarboxylic acids can be introduced or formed in and on the sodium chloride in various conventional ways. However, a preferred way that resulted in much better control of the anticaking performance was to dissolve the metal source, the hydroxypolycarboxylic acid, and optional further components in brine. To this end, one or more metal sources and one or more hydroxypolycarboxylic acids are introduced into a solution of salt (NaCl), optionally after the pH of said solution has been adjusted and/or buffered, with a salt concentration from 10% by weight (% w/w) to saturated. More preferably, the salt concentration in this solution is from 15 to 25% w/w. Most preferably, the salt concentration is about 20% w/w in said solution. Preferably, the metal and the hydroxypolycarboxylic acid(s) are provided on the salt crystals in a conventional way by spraying a solution (preferably in brine) onto the salt. In a preferred embodiment, the solution sprayed onto the salt comprises 20% w/w of salt, an iron source, such as $FeCl_2$, in an amount that will result in about 5 g/kg of Fe" in said solution, and about 25 g/kg of (mesotartaric acid ions. If so desired, the salt is dried further after the addition of the iron complexes of hydroxypolycarboxylic acids or solutions thereof.

EXPERIMENTAL

The pH of the salt is measured in a conventional way using a mixture of 100 g salt and 25 g $H_2O$ at 21° C.

Adhering water in the salt is determined by weight loss measurement upon drying for 4 days at 35° C. and 40% relative humidity. If the ingredients are thermally stable, drying can take place at 120° C. for 2 hours.

Caking is measured in triplicate by filling a cubic copper mould of 5×5×5 cm with (treated) salt and pressing the lid at a pressure of 0.2 kg/cm². Thereafter the resulting salt cubes are stored for 4 days at a temperature of 35° C. and 40% relative humidity. The force needed to break up a fully supported cube by pressing at the top with a circular pad of 15 mm diameter, is recorded. The higher the required force, the more the salt has caked.

EXAMPLE 1

A mesotartaric acid containing treatment solution was prepared by heating a solution of 95 g L(+)-tartaric acid, also known as d-tartaric acid, in 1 kg of aqueous 30% w/w NaOH at 118° C. for two hours. After cooling to room temperature, HCl-solution was added to adjust the pH to 6. Depending on the amount and the type of HCl solution used, NaCl or water was added in order to obtain a solution containing 20% w/w of NaCl. Hereafter $FeCl_2$ was added in such an amount that the solution contained 4.8 g Fe" per 25.5 g of (meso)tartaric acid. In the resulting treatment solution 29.8% w/w of the original L(+)-tartaric acid was transformed into the meso form.

The treatment solution was sprayed onto salt (essentially NaCl) with a water content of 2.5% w/w of which the pH was 6 in an amount of 625 mg/kg. The resulting product showed no caking. The product can be used as road salt, table salt, and the like. Brine solutions produced with the treated salt are pre-eminently suited for use in membrane electrolysis cells.

EXAMPLES 2 AND 3 AND COMPARATIVE EXAMPLES A–C

The treatment solution of Example 4 was sprayed onto salt with a carbonate content of about 0.2 mmol/kg and a moisture content of about 2% w/w in an mount resulting in about 0.8 and 1.4 mg iron/kg being added.

In comparative tests, the same salt either remained untreated or was treated by the conventional addition of about 8 mg/kg or 5 mg/kg of conventional $K_4Fe(CN)_6 \cdot 3H_2O$.

After having been stored for six months in 1,000 kg bags, salt was taken from near the bottom of the bags, and the moisture content and the caking behaviour were analyzed with the following results.

| Example | Anti caking agent | Amount | Moisture (%) | Caking Break force (kg/cm²) |
|---|---|---|---|---|
| 2 | iron citrate | 0.8 mg Fe/kg | 2.02 | 12 |
| 3 | iron citrate | 1.4 mg Fe/kg | 2.05 | 9 |
| A | none | — | 7.32 | 24 |
| B | $K_4Fe(CN)_6 \cdot 3H_2O$ | 5 mg/kg | 2.95 | 7 |
| C | $K_4Fe(CN)_6 \cdot 3H_2O$ | 8 mg/kg | 3.16 | 7 |

This shows that the iron citrate is an effective anti-caking agent that needs to be used in amount of only about 2 mg Fe/kg in order to be as effective as 5 mg/kg conventional $K_4Fe(CN)_6 \cdot 3H_2O$). Furthermore, it shows that the salt treated with iron citrate exhibited the least segregation of water. This salt is pre-eminently suited for use in road salt and table salt.

EXAMPLE 4

A citrate-containing treatment solution was prepared by mixing 734.8 kg water, 250.0 kg NaCl, 6.5 kg ferro sulfate heptahydrate, 4.9 kg citric acid monohydrate, and 3.8 kg sulfuric acid (96%). The molar ratio of iron to citrate was 1:1. This treatment solution was sprayed (45 l/h) onto salt on a conveyor belt (35,000 kg/h) to result in a non-caking salt composition comprising the complexed iron anti-caking agent in a concentration of about 1.7 mg/kg, expressed as the amount of iron in the final product.

30,000 kg of the treated salt were stored indoors in a heap. After 5 weeks the heap could easily be picked up with a shovel, demonstrating that the treated salt is noncaking.

EXAMPLES 5 AND 6 AND COMPARATIVE EXAMPLE D

An aqueous solution of 500 mg/l citric acid or mesotartaric acid was treated under electrolysis conditions, viz. at 85° C. and pH 3, in the presence of chlorine. Decomposition was virtually complete within 6 minutes, since at that moment the a amount of acid was below the detection limit. The citric acid was found to have generated some chloroform. The carbon of the mesotartaric acid was converted into carbon dioxide. A comparative test wherein a cyanide-containing anti-caking agent was used resulted in the formation of undesired $NH_2Cl$, $NHCl_2$, which under membrane electrolysis operation conditions (in the presence of high chlorine concentrations) is converted to undesired $NCl_3$.

EXAMPLES 7–10 AND COMPARATIVE EXAMPLES E AND H

Solutions were prepared containing 250 g/l NaCl and anticaking agent in an amount such that 400 µg Fe/l was present. In the Examples, the molar ratio of hydroxycarboxylic acid to iron was 1:1.

These solutions were stirred at 55° C. for 15 minutes at either pH 6.7 or pH 10.9 (measured at 20° C.). Any iron hydroxide precipitate formed was removed by filtration using a filter with 0.05 µm pores. The amount of residual iron in the filtered solution was analyzed in a conventional way. The following results were obtained:

| Example | Anti-caking agent | PH | residual iron (µg/l) |
|---|---|---|---|
| 7 | iron citrate | 6.7 | 140 |
| 8 | iron mesotartrate | 6.7 | 5 |
| E | none | 6.7 | 300 |
| F | $K_4Fe(CN)_6$ | 6.7 | 400 |
| 9 | iron citrate | 10.9 | 2 |
| 10 | iron mesotartrate | 10.9 | <1 |
| G | none | 10.9 | 4 |
| H | $K_4Fe(CN)_6$ | 10.9 | toohigh |

This shows that the use of iron mesotartrate greatly facilitates the removal of iron from brine. Therefore, non-caking salt containing iron mesotartrate as its anti-caking agent is pre-eminently suited for use in membrane electrolysis operations where iron is detrimental.

EXAMPLES 11–15 AND COMPARATIVE EXAMPLE I.

To an aqueous brine solution (20% w/w NaCl) containing iron and mesotartrate ions in a molar ratio of 1:2 (the amount of mesotartrate being about 3% w/w based on the total composition) an aqueous solution of 15% w/w NaOH was added to obtain a pH as indicated in the table below. This solution was sprayed onto salt such that a total of 3 mg iron was present per kg of the NaCl. In a blank experiment, the salt was not treated. The breaking force of the salt after caking experiments was measured. The results were as follows:

| Example | pH | Caking Break force (kg/cm$^2$) |
|---|---|---|
| 11 | 2 | 11 |
| 12 | 3 | 8 |
| 13 | 4 | 12.7 |
| 14 | 5 | 10.3 |
| 15 | 7.5 | 10 |
| I | no treatment | 44 |

Clearly, the iron mesotartrate complexes can be used over a wide pH range while remaining active as an anti-caking agent. The treatment solution of Example 15 became turbid over time.

EXAMPLE 16

Example 14 was repeated, except that a mixture of iron and aluminium ions (in a 1:1 weight ratio) was substituted for the iron in the treatment solution and said solution was sprayed onto the NaCl such that, per kg of NaCl, 1 mg of Al and 1 mg of Fe ions were present. The caking break force of the so obtained salt was 6 kg/cm$^2$, showing that complexes of mixtures of metals and mesotartrate may be used. However, since aluminium is less desired in both electrolysis operations and food products, the use of just iron may be preferred.

COMPARATIVE EXAMPLE J

Example 14 was repeated, except that the treatment solution was brought to pH 5 using $NH_4OH$ instead of NaOH. The treatment solution became turbid over time and the nitrogen-containing salt composition so obtained led to the formation of undesired $NCl_3$ upon electrolysis of brine produced therefrom, making the use of $NH_4OH$ neutralized complexes less desirable.

EXAMPLES 17 AND 18

Example 14 was repeated, except that chromium and titanium, respectively, were substituted for the iron. The breaking force of the so obtained salt was 6 and 30, respectively, showing that mesotartrate complexes of these two metals are effective anti-caking additives for NaCl. Based on the unoptimized results, iron and chromium complexes of mesotartrate are preferred.

COMPARATIVE EXAMPLES K–N

Example 14 was repeated, except that Ca, Mg, Sr, and Ba, respectively, were substituted for the iron. The breaking force of the so obtained salt was equal to or greater than the breaking force of untreated salt.

What is claimed is:

1. Non-caking salt compositions wherein the salt is predominantly sodium chloride comprising at least one metal complex of mesotartaric acid or a mixture of hydroxypolycarboxylic acids wherein at least 5% by weight of the hydroxypolycarboxylic acids is mesotartaric acid and wherein the metal is iron, titanium, and/or chromium, and wherein the compositions
    are essentially nitrogen-free, comprise an effective amount of the metal complexes of mesotartaric acid or of a mixture of hydroxypolycarboxylic acids wherein at least 5% by weight of the hydroxypolycarboxylic acid is mesotartaric acid, with the molar ratio between metal and hydroxypolycarboxylic acid being from 0.2 to 10, and have a pH of 1 to 10, and optionally contain a pH buffering agent.

2. Non-caking salt composition according to claim 1 further comprising formic acid and/or oxalic acid as pH buffer.

3. Non-caking salt composition according to claim 1 wherein the metal is iron or chromium.

4. Process to make a composition according to any one of claims 1, 2, 3 wherein an essentially nitrogen-free solution comprising NaCl, at least one metal complex of mesotartaric acid or of a mixture of hydroxypolycarboxylic acids wherein at least 5% by weight of the hydroxypolycarboxylic acids is mesotartaric acid, and optionally a pH adjusting agent is sprayed onto salt, the pH of the final composition being from 1 to 10.

5. Process according to claim 4 wherein the untreated salt and the essentially nitrogen-free solution have essentially the same pH.

* * * * *